United States Patent
Nelson et al.

(10) Patent No.: US 6,933,704 B2
(45) Date of Patent: Aug. 23, 2005

(54) SLIP-INDUCING ROTATION STARTING EXCITER FOR TURBINE GENERATOR

(75) Inventors: Robert J. Nelson, Orlando, FL (US); Dennis Perttula, Orlando, FL (US); Stephen Cates, Oviedo, FL (US); Aaron Staley, Sanford, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 248 days.

(21) Appl. No.: 10/270,450

(22) Filed: Oct. 11, 2002

(65) Prior Publication Data

US 2004/0070373 A1 Apr. 15, 2004

(51) Int. Cl.$^7$ ............. H02P 9/30; H02P 9/42; H02K 7/10
(52) U.S. Cl. ............. 322/29; 322/38; 322/39; 322/44; 322/63; 318/718; 318/811
(58) Field of Search ............. 322/17, 29, 38, 322/39, 44, 59, 63, 66; 318/718, 811

(56) References Cited

U.S. PATENT DOCUMENTS

| | | | |
|---|---|---|---|
| 1,499,359 A | * 7/1924 | Fortescue | 363/9 |
| 3,702,964 A | * 11/1972 | Kudlacik et al. | 322/59 |
| 3,702,965 A | * 11/1972 | Drexler et al. | 322/25 |
| 3,768,002 A | * 10/1973 | Drexler et al. | 322/25 |
| 3,809,914 A | 5/1974 | Kilgore et al. | 290/38 |
| 3,908,130 A | 9/1975 | Lafuze | 290/46 |
| 3,908,161 A | 9/1975 | Messenger | 322/29 |
| 4,027,216 A | * 5/1977 | Rozek | 318/718 |
| 4,058,755 A | * 11/1977 | Honbu et al. | 318/47 |
| 4,093,869 A | 6/1978 | Hoffmann et al. | 290/31 |
| 4,152,636 A | * 5/1979 | Gorden | 322/25 |
| 4,219,739 A | 8/1980 | Greenwell | 290/46 |
| 4,295,084 A | * 10/1981 | Nagase et al. | 318/719 |
| 4,330,743 A | 5/1982 | Glennon | 322/10 |
| 4,481,459 A | 11/1984 | Mehl et al. | 322/10 |
| 4,547,719 A | * 10/1985 | Sakamoto et al. | 318/723 |
| 4,625,160 A | 11/1986 | Hucker | 322/32 |
| 4,743,777 A | 5/1988 | Shilling et al. | 290/46 |
| 4,806,841 A | * 2/1989 | Lee et al. | 322/29 |
| 4,841,216 A | 6/1989 | Okada et al. | 322/10 |
| 4,935,684 A | * 6/1990 | Watanabe | 318/729 |
| 4,982,123 A | 1/1991 | Raad | 310/68 D |
| 4,992,920 A | * 2/1991 | Davis | 363/36 |
| 5,068,590 A | 11/1991 | Glennon et al. | 322/10 |
| 5,097,195 A | 3/1992 | Raad et al. | 322/10 |
| 5,287,051 A | * 2/1994 | Konrad et al. | 318/803 |
| 5,430,362 A | 7/1995 | Carr et al. | 318/779 |
| 5,929,612 A | * 7/1999 | Eisenhaure et al. | 322/47 |
| 6,252,331 B1 | 6/2001 | Mildice et al. | 310/263 |
| 6,320,350 B1 | * 11/2001 | Take | 318/811 |
| 6,628,005 B2 | * 9/2003 | Nelson et al. | 290/40 C |
| 6,700,354 B2 | * 3/2004 | Okuno et al. | 322/29 |
| 6,700,355 B2 | * 3/2004 | Aoyama et al. | 322/36 |
| 6,707,276 B2 | * 3/2004 | Takahashi et al. | 322/28 |
| 6,724,166 B2 | * 4/2004 | Narumi et al. | 318/439 |
| 6,734,654 B2 | * 5/2004 | Henneberger | 322/89 |
| 6,737,835 B2 | * 5/2004 | Taniguchi | 322/29 |
| 6,744,240 B2 | * 6/2004 | Koelle et al. | 322/20 |
| 6,750,633 B2 | * 6/2004 | Schreiber | 322/12 |
| 6,750,635 B2 | * 6/2004 | Harmon | 322/29 |
| 6,762,512 B2 | * 7/2004 | Nelson | 290/52 |

* cited by examiner

Primary Examiner—Joseph Waks
Assistant Examiner—Pedro J. Cuevas

(57) ABSTRACT

A dynamoelectric machine combining the functions of an exciter, a turning motor, and a starting motor for a turbine. The machine operates in a first mode where the slip between a first stator winding and a first armature winding is positive and thus the magnetic fields interact and operate as a motor to turn the turbine. In a second mode the slip is negative as the turbine turns the shaft and the first stator winding and the first armature operate as an exciter for supplying excitation to the rotating field winding of a main generator.

15 Claims, 1 Drawing Sheet

SLIP-INDUCING ROTATION STARTING EXCITER FOR TURBINE GENERATOR

FIELD OF THE INVENTION

The present invention relates generally to electrical power generator systems including synchronous generating machines, and more particularly, to winding and current excitation configurations providing motoring and generating operation for various operational modes of the generator system.

BACKGROUND OF THE INVENTION

Combustion or gas turbines are fueled by a pressurized combustible product, such as propane, natural gas, kerosene or jet fuel that supplies energy to drive a plurality of concentric turbine blades mounted on a common shaft. The air is first compressed in a compressor stage then directed to the combustion area. Here the fuel mixes with air and burns, with the resulting high-pressure high-velocity gas directed to the turbine blades, rotating the turbine to extract energy from the combustion process. The turbine shaft is axially connected to a generator shaft, and thus rotation of the turbine shaft imparts rotational energy to the generator shaft for producing electricity as will be described further below. Combustion turbine/generator combinations are available with selectable power output ratings and thus can be used to supply power to an industrial facility or to the electrical grid. Gas turbines are also used as aircraft engines.

It is known that gas turbines are not self-starting machines. Typically a separate motor is employed to provide the starting rotational energy until the gas turbine reaches an operational rotational speed, at which time the motor is disconnected and the combustion process supplies the energy to drive the turbine. For example, the motor drives the turbine up to a speed of several hundred revolutions per minute (rpm), at which point the combustion turbine is ignited. The motor continues to supply rotational assist as the generator reaches its self-sustaining speed. At this point the motor is disconnected since the gas turbine can provide sufficient energy to allow the generator to develop the rated electrical output.

Because of its size and considerable weight, the rotating turbine shaft of large combustion turbines is susceptible to bowing if it remains in one position for an extended period. To overcome this problem, a turning motor (also referred to as a turning gear because the motor output is supplied to the turbine shaft via a gear box) is provided for turning the shaft at a slow speed (for example, 3 rpm) when the unit is not operating. The turning motor also prevents binding of the turbine shaft that can be caused by uneven shaft cooling as the shaft rotational speed declines.

Known generator action of a dynamoelectric machine is employed in the generator to produce the electrical output. Conventionally, a generator comprises at least one stator winding and a rotating field winding. Current is supplied to the field winding from an exciter, as described further below, for inducing current flow in the stator windings as the magnetic field of the rotating field winding cuts across the stator windings. Three-phase alternating current output is supplied from a generator having three independent stator windings spaced at 120° intervals around the stator shell. Single phase AC is supplied from a single stator winding.

The exciter provides direct current (DC) to the rotating field winding of the main generator. Like the main generator, the exciter employs generator action to develop the DC output. The exciter DC output is also regulated to control the intensity of the magnetic field developed by the main generator field winding. Since the stator winding is responsive to this magnetic field, the main generator AC output is thus controlled by the DC input to the rotating field winding.

In one embodiment, the exciter utilizes a rotating winding on the same turbine-driven shaft as the main generator, and a stationary field winding responsive to an externally-generated DC current. As the rotating winding rotates through the stationary magnetic field of the field winding, an AC current is induced in the former. The AC is converted to DC by a rectifier bridge mounted on the rotating shaft, and the resulting DC current is supplied to the main generator field winding through conductors also mounted on the rotating shaft.

Static start, in which the generator operates as a motor, is another known technique for starting a gas turbine engine. Alternating current is supplied to the generator stator winding and alternating current is supplied to the rotating armature from a separate static-start exciter. The AC current is rectified by operation of the rotating rectifier to supply direct current to the generator field. The motoring action produced by the interacting magnetic fields drives the generator, and in turn drives the turbine. Start-up control of the turbine is exercised as described above in conjunction with the separate start-up motor embodiment. Specifically, when the generator/motor speed reaches a pre-determined speed (between 50% and 85% of rated speed), the motoring action is terminated by opening breakers supplying current to the field and armature windings and closing breakers supplying exciting current from the exciter to the rotating field winding to produce generating action.

FIG. 1 illustrates a prior art exciter 10 for supplying DC current to a main generator 12 driven by a primer mover 14, such as a gas turbine, by way of a shaft 15. The generator 12 comprises a field winding 16 responsive to a DC current for producing a three phase AC current in a stator winding 18.

DC current is supplied from an external source to an exciter field winding 26. In response to the DC current, an AC current is induced in the exciter armature winding 28, also driven by the shaft 15. The AC current is rectified by a diode bridge 30 and the output DC current is thus supplied to the field winding 16, which in turn produces the generator output power.

BRIEF SUMMARY OF THE INVENTION

It is advantageous to combine the starting motor, turning motor and exciter functions to lower the costs and simplify the design and operation of a turbine/generator. According to the teachings of the present invention, these functions are provided by a dynamoelectric machine operative as a starter, turning motor and an exciter for a turbine, such as a gas driven turbine. The machine comprises a stator winding and an armature winding magnetically coupled to the stator winding and mounted on the turbine shaft for rotation with respect to the stator winding. Application of AC power to the stator winding induces a magnetic field in the armature winding and causes slip-induced (i.e., positive slip) rotation of the armature winding with respect to the stator winding, and thus rotational force is imposed on the shaft. If the turbine shaft is driven by a prime mover, a rotational force is thereby applied to the armature winding such that the slip is negative and the stator winding induces a magnetic field in the armature winding that produces generator action therein.

BRIEF DESCRIPTION OF THE DRAWINGS

The foregoing and other features of the invention will be apparent from the following more particular description of the invention, as illustrated in the accompanying drawings, in which like reference characters refer to the same parts throughout the different figures. The drawings are not necessarily to scale, emphasis instead being placed upon illustrating the principles of the invention.

DETAILED DESCRIPTION OF THE INVENTION

Figure 1:
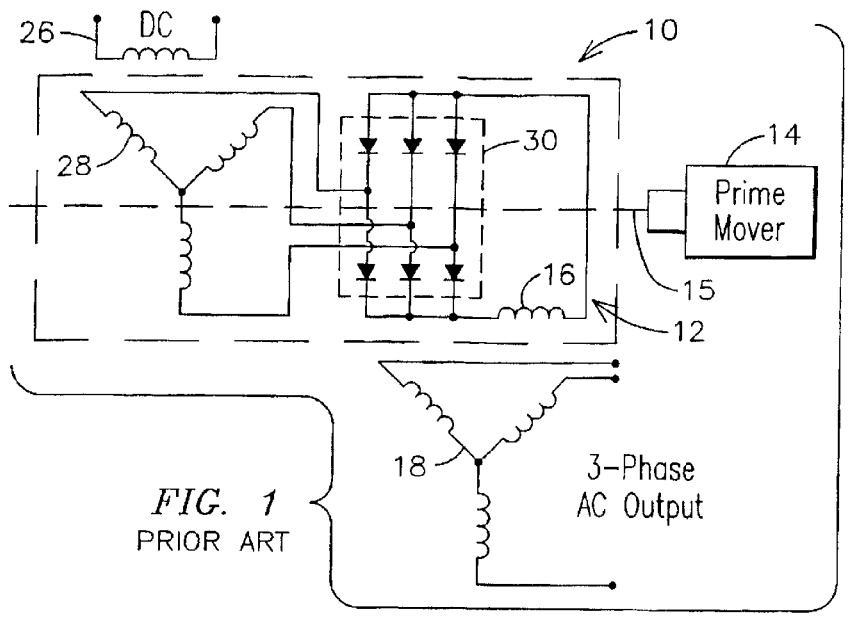
FIG. 1 is a schematic diagram, partially in block diagram form, of a prior art generator and exciter.

Before describing in detail the particular starting exciter in accordance with the present invention, it should be observed that the present invention resides primarily in a novel combination of hardware elements related to a starting exciter. Accordingly, the hardware elements have been represented by conventional elements in the drawings, showing only those specific details that are pertinent to the present invention, so as not to obscure the disclosure with structural details that will be readily apparent to those skilled in the art having the benefit of the description herein.

Figure 2:
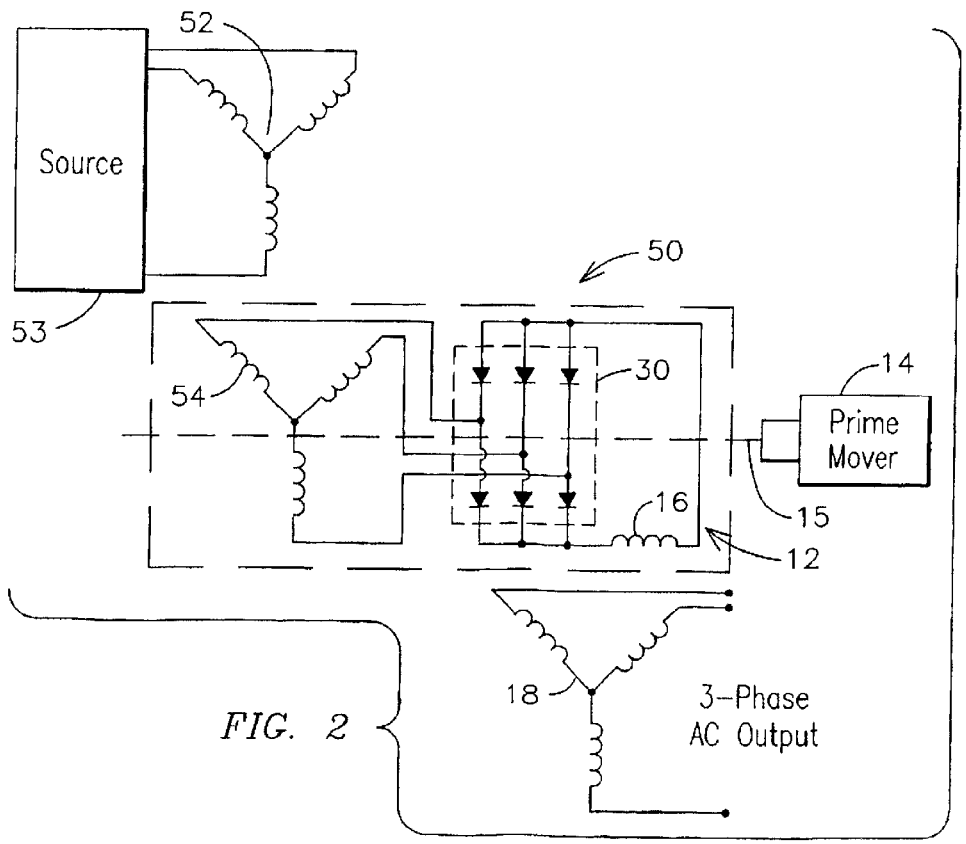
FIG. 2 is a schematic diagram, partially in block diagram form, of a generator and exciter constructed according to the teachings of the present invention.

FIG. 2 illustrates a starter/exciter machine 50 constructed according to the teachings of the present invention and comprising a stator winding 52 responsive to a three-phase alternating current or to a variable frequency current, supplied from source 53. The magnetic field created by the stator winding 52 rotates in accordance with the applied alternating current, thereby inducing current flow in the wound rotor 54, which in turn produces a magnetic field that opposes the original magnetic field. The opposition of theses two magnetic fields produces rotary action in the wound rotor 54. As shown, the wound rotor 54 is mounted on the shaft 15, and the rotational force generated in the wound rotor 54 causes rotation of the shaft 15 and the prime mover 14. Thus, in a first operational mode, the starter/generator exciter 50 operates as a starter motor for the prime mover 14. In one embodiment the starter/generator exciter 50 can start the prime mover 14 from 0 rpm. Since the wound rotor 54 provides a starting torque to the prime mover 14, a separate starting motor as taught by the prior art is not required.

As is known, the current induced in the wound rotor 54 as described above, is due to the relative motion between the rotating magnetic field of the stator 52 and the rotation of the rotor itself. If this relative motion was zero, that is, if the stator field rotated at the rotational speed of the wound rotor, then no current would be induced in the wound rotor, no magnetic field would be produced in the wound rotor and there would be no motor action. Thus the rotating magnetic field must rotate at a higher speed than the rotor to maintain the relative motion between the two and to maintain the motor action. The speed difference between the rotating magnetic field and the rotor is referred to as slip.

The slip can also be defined as the difference between the synchronous speed of a motor and its operating speed, where the synchronous speed is a function only of the number of poles and the applied frequency, as set forth below.

synchronous speed=(120×input frequency)/(number of poles)

When expressed as a fraction of the synchronous speed, the slip is:

slip=(synchronous speed−operating speed)/(synchronous speed)

Thus a four-pole motor has a synchronous speed of 1800 rpm when energized with 60 Hz AC. When the four-pole motor operates at a speed less than 1800 rpm, the slip is positive and thus the motor operates as an induction motor.

The slip of the starter/exciter machine 50 determines whether it operates in the first operational mode, i.e., motoring, or a second generating operational mode. Assuming the rotor comprises four poles, when a frequency of 60 Hz or less is supplied to the stator windings 52 the slip is positive. Thus the counter-acting magnetic field induced in the wound rotor 54 causes the wound rotor 54 and the shaft 15 to turn, i.e., operation in the motoring mode. The starter/exciter thus operates as a starting motor as described above.

By supplying the stator winding 52 from a variable frequency/variable voltage source, the rotational speed of the wound rotor 54 can be controlled (by changing the input frequency or voltage) to implement a turning motor function as described above. In this mode the starter/exciter 50 also operates as a motor, but typically at a slower rotational speed than when operated as a starting motor, to provide the turning motor function. For example, an input frequency of less than 60 Hz causes the starter/exciter machine 50 to impart a slow rotational speed to the shaft 15. The desired turning motor speed can be established in response to the input frequency or input voltage supplied to the stator winding 52. In the motoring mode (whether operational as a starting motor or a turning motor) the resistance of the wound rotor 50 can also be changed to control the rotational speed.

When the speed of the exemplary four-pole wound rotor exceeds about 1800 rpm the slip becomes negative and the starter/exciter machine 50 operates in the second or generating mode. In this mode the prime mover 14 has reached a self-sustaining speed and now requires exciter current to generate power from the stator winding 18. Since the slip of the starter/exciter machine 50 is negative, the magnetic field of the stator winding 52 generates an AC current in the wound rotor 54. The diode bridge 30 rectifies the AC current to DC, which is supplied as an input to the field winding 16.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth herein. In addition, modifications may be made to adapt a particular situation to the teachings of the present invention without departing from its essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A dynamoelectric machine operative as a starter for a turbine or for producing generator action, comprising:

a first stator winding;

a turbine shaft;

an armature winding magnetically coupled to said first stator winding and mounted on said turbine shaft for rotation with respect to said first stator winding;

wherein application of AC power to said first stator winding induces a magnetic field in said armature winding and causes positive slip-induced rotation of said armature winding with respect to said first stator winding such that a rotational force is imposed on said turbine shaft, for operation as a starter; and wherein the slip becomes negative for producing generator action in response to rotational speed of the turbine shaft.

2. The dynamoelectric machine of claim 1 wherein the AC power comprises AC power having a frequency of between about 50 and 60 Hz.

3. The dynamoelectric machine of claim 1 wherein the AC power comprises AC power having a selectable variable frequency.

4. The dynamoelectric machine of claim 3 wherein the rotational speed of the turbine shaft is in response to the selectable variable frequency.

5. The dynamoelectric machine of claim 1 wherein the AC power comprises AC power having a selectable voltage magnitude.

6. The dynamoelectric machine of claim 5 wherein the rotational speed of the turbine shaft is in response to the selectable voltage magnitude.

7. The dynamoelectric machine of claim 1 further comprising:
- a prime mover for applying a rotational force to the armature winding such that the slip is negative and the first stator winding induces a magnetic field in the armature winding producing generator action therein.

8. The dynamoelectric machine of claim 7 wherein the slip is positive when the rotational speed of the turbine shaft is below a predetermined value, and wherein the slip is negative when the rotational speed of the turbine shaft is above the predetermined value.

9. The dynamoelectric machine of claim 7 further comprising:
- a rectifier bridge;
- a generator, comprising
   - a field winding;
   - a second stator winding; and
- wherein when the dynamoelectric machine is operative to produce generating action, the armature winding supplies AC power to said rectifier bridge for producing DC power in response thereto, and wherein the DC power is supplied to said field winding for inducing a current therein.

10. The dynamoelectric machine of claim 1 wherein the number of poles of the first stator winding is four, six, or eight.

11. A dynamoelectric machine for producing AC output power in response to rotational energy supplied by a prime mover, comprising
- a first stator winding;
- a shaft;
- a field winding magnetically coupled to said first stator winding and mounted on said shaft for rotation with respect to said first stator winding;
- a second stator winding;
- an armature winding magnetically coupled to said second stator winding and mounted an said shaft for rotation with respect to said second stator winding;
- a rectifier bridge;
- wherein alternating current is supplied to said first stator winding for inducing a magnetic field in said field winding in a first operational mode causing positive slip-induced rotation of said field winding with respect to said first stator winding such that a rotational force is imparted to said shaft;
- and wherein application of a rotational force to said shaft by the prime mover causes operation in a second operational mode such that the slip is negative and said first stator winding induces a magnetic field in said field winding by generator action, and wherein the output from said field winding is supplied as an input to said rectifier bridge, and wherein said rectifier bridge produces a DC output signal current supplied as an input to said armature winding to produce generator action in said second stator winding for producing the AC output power.

12. The dynamoelectric machine of claim 11 wherein the slip is positive when the rotational speed of the shaft is below a predetermined value, and wherein the slip is negative when the rotational speed of the shaft is above the predetermined value.

13. The dynamoelectric machine of claim 12 wherein the field winding comprises four poles, and wherein the predetermined value is 1800 rpm wherein the input alternating current supplied to the first stator winding is 60 Hz.

14. The dynamoelectric machine of claim 13 wherein the alternating current supplied to the first stator winding has a variable frequency.

15. The dynamoelectric machine of claim 13 wherein the alternating current supplied to the first stator winding has a variable voltage.

* * * * *